US 11,377,515 B2

(12) United States Patent
Ahn et al.

(10) Patent No.: US 11,377,515 B2
(45) Date of Patent: Jul. 5, 2022

(54) METHOD FOR PREPARING GRAFT COPOLYMER AND GRAFT COPOLYMER

(71) Applicant: LG CHEM, LTD., Seoul (KR)

(72) Inventors: Bong Keun Ahn, Daejeon (KR); Min Jung Kim, Daejeon (KR); Wang Rae Joe, Daejeon (KR); Yong Yeon Hwang, Daejeon (KR); Jang Won Park, Daejeon (KR); Ji Yoon Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/968,996

(22) PCT Filed: Aug. 28, 2019

(86) PCT No.: PCT/KR2019/011009
§ 371 (c)(1),
(2) Date: Aug. 11, 2020

(87) PCT Pub. No.: WO2020/050544
PCT Pub. Date: Mar. 12, 2020

(65) Prior Publication Data
US 2021/0024678 A1    Jan. 28, 2021

(30) Foreign Application Priority Data

Sep. 5, 2018    (KR) .................. 10-2018-0106053

(51) Int. Cl.
| | | |
|---|---|---|
| C08F 285/00 | (2006.01) | |
| C08L 51/00 | (2006.01) | |
| C08F 265/04 | (2006.01) | |
| C08L 25/12 | (2006.01) | |

(52) U.S. Cl.
CPC .......... *C08F 285/00* (2013.01); *C08F 265/04* (2013.01); *C08L 25/12* (2013.01); *C08L 51/003* (2013.01)

(58) Field of Classification Search
CPC .................................................. C08F 265/04
See application file for complete search history.

(56) References Cited

U.S. PATENT DOCUMENTS

| | | | | |
|---|---|---|---|---|
| 2006/0270813 A1* | 11/2006 | Clikeman | ............... | C08F 10/00 526/159 |
| 2011/0112235 A1* | 5/2011 | Taden | ................ | C09D 151/003 524/502 |
| 2013/0131261 A1 | 5/2013 | Zecha et al. | | |
| 2014/0235749 A1* | 8/2014 | Kim | ........................ | C08L 25/12 523/122 |
| 2016/0297915 A1* | 10/2016 | Lee | ........................ | C08F 265/06 |
| 2017/0355885 A1* | 12/2017 | Mechernich | ........... | C09J 123/22 |
| 2018/0044485 A1* | 2/2018 | Rousseaux | ............ | C08K 3/041 |
| 2018/0298184 A1* | 10/2018 | Jang | ........................ | C08L 51/04 |

FOREIGN PATENT DOCUMENTS

| | | |
|---|---|---|
| JP | 2014-527570 A | 10/2014 |
| KR | 10-0867391 | 11/2008 |
| KR | 10-2009-0067965 | 6/2009 |
| KR | 10-2013-0135318 | 12/2013 |
| KR | 10-2014-0027872 | 3/2014 |
| KR | 10-2015-0015899 | 2/2015 |
| KR | 10-2015-0028194 | 3/2015 |
| KR | 10-1651736 | 9/2016 |
| KR | 10-1716927 | 3/2017 |
| KR | 10-2018-0047949 | 5/2018 |
| KR | 10-0591447 | 6/2020 |
| WO | WO2020050544 | 3/2020 |

OTHER PUBLICATIONS

LG Chem, Ltd, electronic translation of KR 1020150028194 Sep. 2016.*

* cited by examiner

*Primary Examiner* — Jeffrey C Mullis
(74) *Attorney, Agent, or Firm* — Morgan, Lewis & Bockius LLP

(57) ABSTRACT

A method for preparing a graft copolymer includes the steps of: 1) preparing a seed by adding one or more selected from the group consisting of an alkyl (meth)acrylate-based monomer, an aromatic vinyl-based monomer, and a vinyl cyan-based monomer and carrying out polymerization; 2) preparing a core in the presence of the seed by adding an alkyl (meth)acrylate-based monomer and carrying out polymerization; and 3) preparing a shell in the presence of the core by adding an aromatic vinyl-based monomer and a vinyl cyan-based monomer and carrying out polymerization, wherein an activator including a compound represented by Chemical Formula 1 is added in the step 3).

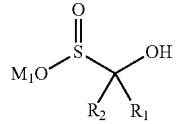

<Chemical Formula 1>

In Chemical Formula 1, $R_1$ and $R_2$ are each independently hydrogen, a $C_1$-$C_{10}$ alkyl group, or *-(C=O)$OM_2$, provided that $R_1$ and $R_2$ are not both hydrogen, and $M_1$ and $M_2$ are each independently an alkali metal.

15 Claims, No Drawings

METHOD FOR PREPARING GRAFT COPOLYMER AND GRAFT COPOLYMER

CROSS-REFERENCE TO RELATED APPLICATION

The present application is a National Phase entry of International Application No. PCT/KR2019/011009 filed on Aug. 28, 2019, which claims priority to and the benefit of Korean Patent Application No. 10-2018-0106053, filed on Sep. 5, 2018, the disclosure of which is incorporated herein by reference in its entirety.

TECHNICAL FIELD

The present invention relates to a method for preparing a graft copolymer and a graft copolymer, and more particularly, to a method for preparing a graft copolymer that is excellent in impact resistance, thermal stability, surface clarity, whiteness, appearance quality, and weather resistance and a graft copolymer.

BACKGROUND ART

Acrylonitrile-butadiene-styrene (ABS) graft copolymers are excellent in impact resistance, rigidity, chemical resistance, and processability, so they are widely used in various fields such as electrical and electronic products, construction, automobiles, and the like. However, since a butadiene polymer is used as a rubber component thereof, ABS graft copolymers have poor weather resistance and thus have limited use in outdoor applications.

As a representative material that not only can solve the weather resistance issue but also has excellent basic properties and excellent aging resistance, an acrylonitrile-styrene-acrylate (ASA) graft copolymer is known.

In the preparation of a shell for an ASA graft copolymer, an acrylic polymer, an initiator, and a ferrous sulfate/dextrose/sodium pyrophosphate (FeS/DX/SPP) system or a ferrous sulfate/sodium formaldehyde sulfoxylate/sodium ethylenediaminetetraacetate (FeS/SFS/EDTA) system as an activator are used. However, dextrose used as a reducing agent in the FeS/DX/SPP system is easily discolored by heat and thus degrades thermal stability when remaining in a graft copolymer, and sodium formaldehyde sulfoxylate used as a reducing agent in the FeS/SFS/EDTA system is pyrolyzed to produce an aldehyde, which, when remaining in a graft copolymer, becomes a gas-generating material during the processing of the graft copolymer. In addition, ferrous sulfate used in both systems is known to degrade the performance of a graft copolymer when remaining therein.

As the area of application of ASA graft copolymers has recently been broadened to thinner materials such as exterior materials (e.g., sidings), sheets, coextruded films, and the like, there is an increasing demand for ASA graft copolymers that generate less gas and have improved thermal stability due to including a reduced amount of residue. In addition, there is an increasing demand for exterior materials having decorative characteristics.

Therefore, research on ASA graft copolymers having excellent appearance quality and excellent colorability while having improved thermal stability is being conducted.

DISCLOSURE

Technical Problem

The present invention is directed to providing a method for preparing a graft copolymer in which impact resistance, thermal stability, surface clarity, whiteness, appearance quality, and weather resistance are particularly improved while basic properties are maintained.

Technical Solution

In order to achieve the above-described objectives, one aspect of the present invention provides a method for preparing a graft copolymer, which includes: 1) preparing a seed by adding one or more selected from the group consisting of an alkyl (meth)acrylate-based monomer, an aromatic vinyl-based monomer, and a vinyl cyan-based monomer and carrying out polymerization; 2) preparing a core in the presence of the seed by adding an alkyl (meth)acrylate-based monomer and carrying out polymerization; and 3) preparing a shell in the presence of the core by adding an aromatic vinyl-based monomer and a vinyl cyan-based monomer and carrying out polymerization, wherein an activator including a compound represented by Chemical Formula 1 is added in the step 3), and wherein the core has an average particle diameter of 320 to 520 nm.

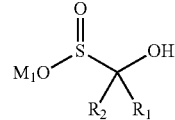

<Chemical Formula 1>

In Chemical Formula 1, $R_1$ and $R_2$, which are the same or different from each other, are each independently hydrogen, a $C_1$-$C_{10}$ alkyl group, or *—(C=O)$OM_2$, provided that $R_1$ and $R_2$ are not both hydrogen, and $M_1$ and $M_2$, which are the same or different from each other, are each independently an alkali metal.

In addition, another aspect of the present invention provides a graft copolymer, which includes: an alkyl (meth)acrylate-based monomer unit; an aromatic vinyl-based monomer unit; a vinyl cyan-based monomer uint; and a derivative of a compound represented by Chemical Formula 1, and which has a core with an average particle diameter of 320 to 520 nm.

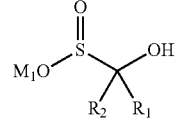

<Chemical Formula 1>

In Chemical Formula 1, $R_1$ and $R_2$, which are the same or different from each other, are each independently hydrogen, a $C_1$-$C_{10}$ alkyl group, or *—(C=O)$OM_2$, provided that $R_1$ and $R_2$ are not both hydrogen, and $M_1$ and $M_2$, which are the same or different from each other, are each independently an alkali metal.

In addition, still another aspect of the present invention provides a thermoplastic resin molded article, which is formed of a thermoplastic resin composition comprising the above-described graft copolymer; and a matrix copolymer including an aromatic vinyl-based monomer unit and a vinyl cyan-based monomer unit, and which has an impact strength of 21.3 kg. cm/cm or more and a thermal retention stability of 4.5 or less.

Advantageous Effects

According to the method for preparing a graft copolymer of the present invention, it is possible to remarkably improve impact resistance, thermal stability, surface clarity, whiteness, appearance quality, and weather resistance while maintaining basic properties such as fluidity and the like at about the same level as in conventional cases.

BEST MODE

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

In the present invention, the average particle diameters of a seed, a core, and a graft copolymer can be measured using a dynamic light scattering method, and specifically, using a Nicomp 380 instrument (manufactured by PSS Nicomp).

In the present specification, an average particle diameter may refer to an arithmetic average particle diameter in the particle size distribution as measured by a dynamic light scattering method. The arithmetic average particle diameter can be measured as an average particle diameter in a scattering intensity distribution, a volume distribution, or a number distribution, and is preferably an average particle diameter measured in the scattering intensity distribution.

In the present invention, the total amount of volatile organic compounds (VOCs) can be determined at a ppm level by subjecting 1 g of a graft copolymer to headspace gas chromatography with flame ionization detection (HS-GC/FID) and analyzing the components of the volatile organic compounds released under the conditions of 230° C., 60 minutes, and 20 ml.

In the present invention, thermogravimetric analysis (TGA) can be carried out by increasing the temperature of 0.1 g of a graft copolymer powder from 30° C. to 250° C. at a rate of 20° C./min under a nitrogen atmosphere and then maintaining the temperature at 250° C. for 1 hour. Here, weight loss can be measured and is expressed in terms of a residual amount (in wt %).

In the present invention, the impact strength of a specimen prepared by extruding and injection-molding a thermoplastic resin composition can be measured in accordance with ASTM 256.

In the present invention, thermal retention stability can be determined by measuring the L, a, and b values of a retention specimen and a non-retention specimen with a spectrophotometer and then calculating a degree of discoloration (ΔE) using the equation provided below, wherein the retention specimen is prepared by introducing a thermoplastic resin composition into an injection-molding machine after extrusion thereof and injection-molding the composition at 260° C. after maintaining it in a 260° C. injection-molding machine for 5 minutes, and the non-retention specimen is prepared by introducing a thermoplastic resin composition, which is in the form of a pellet, into an injection-molding machine and injection-molding the composition at 260° C. without retention.

$$\Delta E = \sqrt{(L'-L)^2 + (a'-a)^2 + (b'-b)^2}$$

In the present invention, the "monomers added in the method for preparing a graft copolymer" may refer to "an alkyl (meth)acrylate-based monomer, an aromatic vinyl-based monomer, and a vinyl cyan-based monomer which are added in the preparation of a seed, a core, and a shell."

1. Method for Preparing Graft Copolymer

The method for preparing a graft copolymer according to one embodiment of the present invention includes: 1) preparing a seed by adding one or more selected from the group consisting of an alkyl (meth)acrylate-based monomer, an aromatic vinyl-based monomer, and a vinyl cyan-based monomer and carrying out polymerization; 2) preparing a core in the presence of the seed by adding an alkyl (meth)acrylate-based monomer and carrying out polymerization; and 3) preparing a shell in the presence of the core by adding an aromatic vinyl-based monomer and a vinyl cyan-based monomer and carrying out polymerization, wherein an activator including a compound represented by Chemical Formula 1 is added in the step 3), and wherein the core has an average particle diameter of 320 to 520 nm.

<Chemical Formula 1>

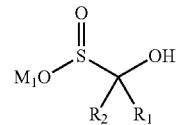

In Chemical Formula 1, $R_1$ and $R_2$, which are the same or different from each other, are each independently hydrogen, a $C_1$-$C_{10}$ alkyl group, or *—(C=O)OM$_2$, provided that $R_1$ and $R_2$ are not both hydrogen, and $M_1$ and $M_2$, which are the same or different from each other, are each independently an alkali metal.

Hereinafter, the method for preparing a graft copolymer according to one embodiment of the present invention will be described in detail.

Step 1)

First, a seed is prepared by adding one or more selected from the group consisting of an alkyl (meth)acrylate-based monomer, an aromatic vinyl-based monomer, and a vinyl cyan-based monomer and carrying out polymerization.

The alkyl (meth)acrylate-based monomer may be one or more selected from the group consisting of methyl (meth)acrylate, ethyl (meth)acrylate, propyl (meth)acrylate, butyl (meth)acrylate, 2-ethylhexyl (meth)acrylate, decyl (meth)acrylate, and lauryl (meth)acrylate, with butyl methacrylate being preferred.

The aromatic vinyl-based monomer may be one or more selected from the group consisting of styrene, α-methylstyrene, α-ethylstyrene, p-methylstyrene, and vinyl toluene, with styrene being preferred.

The vinyl cyan-based monomer may be one or more selected from among acrylonitrile, methacrylonitrile, phenyl acrylonitrile, α-chloroacrylonitrile, and ethacrylonitrile, with acrylonitrile being preferred.

The total amount of the monomers added in the step 1) may be 1 to 20 wt % or 4 to 15 wt % based on the total weight of the monomers added in the method for preparing a graft copolymer, with the range of 4 to 15 wt % being preferred. When the above-described range is satisfied, a graft copolymer having improved colorability, improved impact resistance, and improved chemical resistance can be prepared.

In order to prepare a graft copolymer with excellent impact resistance, in the step 1), it is preferred that the seed is prepared by adding an aromatic vinyl-based monomer and a vinyl cyan-based monomer and carrying out polymerization.

In this case, in the step 1), the aromatic vinyl-based monomer and the vinyl cyan-based monomer may be added in a weight ratio of 60:40 to 80:20 or 65:35 to 75:25 and specifically 65:35 to 75:25. When the above-described range is satisfied, a graft copolymer having excellent impact resistance and excellent colorability can be prepared.

The seed may have an average particle diameter of 145 to 255 nm, 150 to 250 nm, or 170 to 230 nm, with the range of 170 to 230 nm being preferred. When the above-described range is satisfied, a graft copolymer which exhibits excellent stability during polymerization and has excellent impact resistance and excellent surface gloss characteristics can be prepared.

The polymerization may be emulsion polymerization, and may be carried out at 50 to 85° C. or 60 to 80° C., with the range of 60 to 80° C. being preferred. When the above-described range is satisfied, emulsion polymerization can be stably carried out.

In the step 1), one or more selected from the group consisting of an initiator, an emulsifier, a crosslinking agent, a grafting agent, an electrolyte, and water may be further added.

The initiator may be a radical initiator. The initiator may be one or more selected from the group consisting of: inorganic peroxides such as sodium persulfate, potassium persulfate, ammonium persulfate, potassium perphosphate, hydrogen peroxide, and the like; organic peroxides such as t-butyl peroxide, t-butyl hydroperoxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, t-butylperoxy isobutyrate, and the like; azobis (isobutyronitrile), azobis-2,4-dimethylvaleronitrile, azobis (cyclohexanecarbonitrile), and azobis(methyl isobutyrate), with inorganic peroxides being preferred and potassium persulfate being more preferred.

The initiator may be added in an amount of 0.01 to 1 part by weight or 0.02 to 0.8 part by weight based on 100 parts by weight of the monomers added in the method for preparing a graft copolymer, with the range of 0.02 to 0.8 part by weight being preferred. When the above-described range is satisfied, polymerization can be easily carried out.

As the emulsifier, one or more selected from the group consisting of an alkyl sulfosuccinic acid metal salt, an alkyl sulfuric acid ester metal salt, a rosin acid metal salt, and a dimer acid metal salt may be added, and an alkyl sulfuric acid ester metal salt is preferably added.

The alkyl sulfosuccinic acid metal salt may be one or more selected from the group consisting of sodium dicyclohexyl sulfosuccinate, sodium dihexyl sulfosuccinate, sodium di-2-ethylhexyl sulfosuccinate, potassium di-2-ethylhexyl sulfosuccinate, and di-2-ethylhexyl sulfosuccinate.

The alkyl sulfuric acid ester metal salt may be one or more selected from the group consisting of sodium dodecyl sulfate, sodium dodecylbenzene sulfate, sodium octadecyl sulfate, sodium oleic sulfate, potassium dodecyl sulfate, and potassium octadecyl sulfate.

The rosin acid metal salt may be one or more selected from the group consisting of potassium rosinate and sodium rosinate.

The emulsifier may be added in an amount of 0.01 to 5 parts by weight or 0.05 to 4.5 parts by weight based on 100 parts by weight of the monomers added in the method for preparing a graft copolymer, with the range of 0.05 to 4.5 parts by weight being preferred. When the above-described range is satisfied, a seed having a desired average particle diameter can be easily prepared.

The crosslinking agent may be one or more selected from the group consisting of ethylene glycol di(meth)acrylate, polyethylene glycol di(meth)acrylate, polypropylene glycol di(meth)acrylate, divinylbenzene, diethylene glycol di(meth)acrylate, triethylene glycol di(meth)acrylate, 1,3-butadiol dimethacrylate, hexanediol ethoxylate diacrylate, hexanediol propoxylate di(meth)acrylate, neopentyl glycol dimethacrylate, neopentyl glycol ethoxylate di(meth)acrylate, neopentyl glycol propoxylate di(meth)acrylate, trimethylolmethane tri(meth)acrylate, trimethylolpropane tri(meth)acrylate, trimethylpropane ethoxylate tri(meth)acrylate, trimethylpropane propoxylate tri(meth)acrylate, pentaerythritol ethoxylate tri(meth)acrylate, pentaerythritol propoxylate tri(meth)acrylate, and vinyltrimethoxysilane, with ethylene glycol dimethacrylate being preferred.

The crosslinking agent may be added in an amount of 0.01 to 1 part by weight or 0.02 to 0.8 part by weight based on 100 parts by weight of the monomers added in the method for preparing a graft copolymer, with the range of 0.02 to 0.8 part by weight being preferred. When the above-described range is satisfied, since some of the monomers added in the step 1) are crosslinked to prepare a crosslinked product and the remainder is graft-polymerized to the crosslinked product, a seed having a desired average particle diameter can be prepared.

The grafting agent may be one or more selected from the group consisting of allyl methacrylate, triallyl isocyanurate, diallylamine, and triallylamine, with allyl methacrylate being preferred.

The grafting agent may be added in an amount of 0.001 to 3 parts by weight or 0.005 to 2.5 parts by weight based on 100 parts by weight of the monomers added in the method for preparing a graft copolymer, with the range of 0.005 to 2.5 parts by weight being most preferred. When the above-described range is satisfied, since some of the monomers added in the step 1) are crosslinked to prepare a crosslinked product and the remainder is graft-polymerized to the crosslinked product, a seed having a desired average particle diameter can be prepared.

The electrolyte may be one or more selected from the group consisting of $KCl$, $NaCl$, $KHCO_3$, $NaHCO_3$, $K_2CO_3$, $Na_2CO_3$, $KHSO_3$, $NaHSO_4$, $Na_2S_2O_7$, $K_4P_2O_7$, $K_3PO_4$, and $Na_3PO_4$ or the group consisting of $Na_2HPO_4$, $KOH$, and $NaOH$, with $KOH$ being preferred.

The electrolyte may be added in an amount of 0.001 to 1 part by weight or 0.01 to 0.8 part by weight based on 100 parts by weight of the monomers added in the method for preparing a graft copolymer, with the range of 0.01 to 0.8 part by weight being preferred. When the above-described range is satisfied, the pH of a polymerization solution can be increased but seed latex stability can still be maintained during emulsion polymerization. In addition, a seed having a desired average particle diameter can be stably obtained.

The water may be distilled water or ion-exchanged water.

Step 2)

Subsequently, a core is prepared in the presence of the seed by adding an alkyl (meth)acrylate-based monomer and carrying out polymerization.

Types of the alkyl (meth)acrylate-based monomer have been described above.

The alkyl (meth)acrylate-based monomer may be added in an amount of 40 to 60 wt % or 45 to 55 wt % based on the total weight of the monomers added in the method for preparing a graft copolymer, with the range of 45 to 55 wt % being preferred. When the above-described range is satisfied, a graft copolymer having improved impact resistance and improved weather resistance can be prepared.

The alkyl (meth)acrylate-based monomer may be continuously added at a constant rate to control heat during polymerization and to easily control the core to have an appropriate average particle diameter.

The polymerization may be emulsion polymerization, and may be carried out at 50 to 85° C. or 60 to 80° C., with the range of 60 to 80° C. being preferred. When the above-described range is satisfied, emulsion polymerization can be stably carried out.

The core may have an average particle diameter of 320 to 520 nm, preferably 330 to 500 nm, and more preferably 350 to 450 nm. When the above-described range is satisfied, a graft copolymer which exhibits excellent stability during polymerization and is excellent in weather resistance, impact resistance, and surface gloss characteristics can be prepared. When the average particle diameter is below the above-described range, impact resistance may be lowered, and when the average particle diameter exceeds the above-described range, surface gloss characteristics may be degraded.

In the step 2), one or more selected from the group consisting of an initiator, an emulsifier, a crosslinking agent, a grafting agent, and water may be further added, and, in order to control heat during polymerization and to easily control the core to have an appropriate average particle diameter, it/they may be continuously added at a constant rate along with the alkyl (meth)acrylate-based monomer.

Types of the initiator have been described above, and among those listed, inorganic peroxides are preferred, and potassium persulfate is more preferred.

The initiator may be added in an amount of 0.01 to 3 parts by weight or 0.02 to 2.5 parts by weight based on 100 parts by weight of the monomers added in the method for preparing a graft copolymer, with the range of 0.02 to 2.5 parts by weight being preferred. When the above-described range is satisfied, polymerization can be easily carried out.

Types of the emulsifier have been described above, and among those listed, it is preferable that an alkyl sulfuric acid ester metal salt is used.

The emulsifier may be added in an amount of 0.01 to 5 parts by weight or 0.05 to 4.5 parts by weight based on 100 parts by weight of the monomers added in the method for preparing a graft copolymer, with the range of 0.05 to 4.5 parts by weight being preferred. When the above-described range is satisfied, emulsion polymerization can be easily carried out, and at the same time, a core having a desired average particle diameter can be easily prepared.

Types of the crosslinking agent have been described above.

The crosslinking agent may be added in an amount of 0.01 to 1 part by weight or 0.02 to 0.8 part by weight based on 100 parts by weight of the monomers added in the method for preparing a graft copolymer, with the range of 0.02 to 0.8 part by weight being preferred. When the above-described range is satisfied, the core can have an appropriate degree of crosslinking.

Types of the grafting agent have been described above.

The grafting agent may be added in an amount of 0.01 to 1 part by weight or 0.02 to 0.8 part by weight based on 100 parts by weight of the monomers added in the method for preparing a graft copolymer, with the range of 0.02 to 0.8 part by weight being preferred. When the above-described range is satisfied, the core can have an appropriate average particle diameter.

The water may be distilled water or ion-exchanged water.

Step 3)

Subsequently, a shell is prepared in the presence of the core by adding an aromatic vinyl-based monomer and a vinyl cyan-based monomer and carrying out polymerization.

In this case, in the step 3), an activator including a compound represented by Chemical Formula 1 is added:

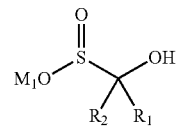

<Chemical Formula 1>

In Chemical Formula 1, $R_1$ and $R_2$, which are the same or different from each other, are each independently hydrogen, a $C_1$-$C_{10}$ alkyl group, or *—(C=O)O$M_2$, provided that $R_1$ and $R_2$ are not both hydrogen, and $M_1$ and $M_2$, which are the same or different from each other, are each independently an alkali metal.

The compound represented by Chemical Formula 1 can significantly improve the impact resistance, thermal stability, surface clarity, and whiteness of the graft copolymer.

In addition, since the compound represented by Chemical Formula 1 does not produce formaldehyde when decomposed unlike sodium formaldehyde sulfoxylate used as a conventional activator, the total amount of volatile organic compounds in the graft copolymer is significantly reduced. Since the amount of gas generation from volatile organic compounds during the processing of the graft copolymer is accordingly significantly reduced, a thermoplastic resin molded article which has excellent appearance quality by having a minimized number of gas marks on its surface can be prepared.

Meanwhile, conventional activators include: ferrous sulfate; sodium pyrophosphate or sodium ethylenediaminetetraacetate as a chelating agent; and dextrose or sodium formaldehyde sulfoxylate as a reducing agent. The ferrous sulfate remaining in a graft copolymer degrades the performance of the graft copolymer. Dextrose is easily discolored by heat and thus degrades the thermal stability of a graft copolymer when remaining therein. Sodium formaldehyde sulfoxylate is pyrolyzed to produce an aldehyde, which generates a gas during the injection-molding of the graft copolymer.

The compound represented by Chemical Formula 1 can independently serve as an activator, in which case, since ferrous sulfate, sodium pyrophosphate, sodium ethylenediaminetetraacetate, dextrose, sodium formaldehyde sulfoxylate, and the like are not added, the above-described problems are not caused.

In Chemical Formula 1, $M_1$ and $M_2$, which are the same or different from each other, are each independently preferably Na or K and more preferably Na.

In Chemical Formula 1, $R_1$ and $R_2$, which are the same or different from each other, are each independently preferably hydrogen or —(C=O)$OM_2$.

When the above-described conditions are satisfied, the impact resistance, thermal stability, surface clarity, whiteness, appearance quality, and weather resistance of the graft copolymer can be improved.

The activator may include a compound represented by Chemical Formula 2.

<Chemical Formula 2>

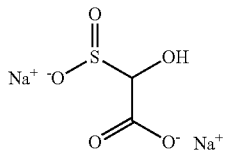

It is preferred that the activator is continuously added so that excellent activity can be unvaryingly maintained and the fluidity and impact resistance of the graft copolymer can be improved. In addition, it is preferred that the activator is added in a state of being mixed with a solvent for the continuous addition thereof. The solvent may be water.

The activator may be added in an amount of 0.01 to 1 part by weight or 0.1 to 0.8 part by weight based on 100 parts by weight of the monomers added in the method for preparing a graft copolymer, with the range of 0.1 to 0.8 part by weight being preferred. When the above-described content is satisfied, the initiation of polymerization can be promoted.

Meanwhile, the activator may be directly prepared, or a commercially available product Bruggolite® FF6M (manufactured by Bruggemann Chemical) may be used as the activator.

Types of the aromatic vinyl-based monomer and the vinyl cyan-based monomer have been described above.

The aromatic vinyl-based monomer and the vinyl cyan-based monomer may be added in an amount such that the sum thereof is 30 to 55 wt % or 35 to 50 wt % based on the total weight of the monomers added in the method for preparing a graft copolymer, with the range of 35 to 50 wt % being preferred. When the above-described range is satisfied, there is an advantage that the balance among the weather resistance, fluidity, and chemical resistance of the graft copolymer is excellent.

The aromatic vinyl-based monomer and the vinyl cyan-based monomer may be added in a weight ratio of 65:35 to 85:15 or 70:30 to 80:20, with the range of 70:30 to 80:20 being preferred. When the above-described range is satisfied, there is an advantage that the balance between the fluidity and chemical resistance of the graft copolymer is excellent.

The aromatic vinyl-based monomer and the vinyl cyan-based monomer may be continuously added at a constant rate, in which case, heat can be controlled during polymerization, and a graft copolymer in which physical properties are well balanced can be easily prepared.

In the step 3), it is preferred that an alkyl (meth)acrylate-based monomer is not added because it may degrade the colorability, impact resistance, processability, and surface gloss characteristics of the graft copolymer.

The polymerization may be emulsion polymerization, and may be carried out at 50 to 85° C. or 60 to 80° C., with the range of 60 to 80° C. being preferred. When the above-described range is satisfied, emulsion polymerization can be stably carried out.

The graft copolymer may have an average particle diameter of 400 to 700 nm or 450 to 600 nm, with the range of 450 to 600 nm being preferred. When the above-described range is satisfied, a graft copolymer which exhibits excellent stability during polymerization and is excellent in impact resistance, fluidity, chemical resistance can be prepared.

In the step 3), one or more selected from the group consisting of an initiator, an emulsifier, a molecular-weight regulator, and water may be further added, and it/they may be continuously added along with the aromatic vinyl-based monomer and the vinyl cyan-based monomer.

Types of the initiator have been described above, and among those listed, organic peroxides are preferred, and cumene hydroperoxide is more preferred.

The initiator may be added in an amount of 0.01 to 3 parts by weight or 0.02 to 2.5 parts by weight based on 100 parts by weight of the monomers added in the method for preparing a graft copolymer, with the range of 0.02 to 2.5 parts by weight being preferred. When the above-described range is satisfied, the polymerization of a graft copolymer having excellent mechanical properties and excellent processability can be easily carried out.

Types of the emulsifier have been described above, and among those listed, it is preferred that a rosin acid metal salt is used.

The emulsifier may be added in an amount of 0.1 to 2.5 parts by weight or 0.5 to 2 parts by weight based on 100 parts by weight of the monomers added in the method for preparing a graft copolymer, with the range of 0.5 to 2 parts by weight being preferred. When the above-described range is satisfied, a graft copolymer having a desired average particle diameter can be easily prepared.

The molecular-weight regulator may be an α-methyl styrene dimer; a mercaptan such as t-dodecyl mercaptan, n-dodecyl mercaptan, or octyl mercaptan; a halogenated hydrocarbon such as carbon tetrachloride, methylene chloride, or methylene bromide; or a sulfur-containing compound such as tetraethylthiuram disulfide, dipentamethylene thiuram disulfide, or diisopropyl xanthogen disulfide. Preferably, the molecular-weight regulator is t-dodecyl mercaptan.

The molecular-weight regulator may be added in an amount of 0.001 to 1 part by weight or 0.01 to 0.8 part by weight based on 100 parts by weight of the monomers added in the method for preparing a graft copolymer, with the range of 0.01 to 0.8 part by weight being preferred. When the above-described range is satisfied, since the weight-average molecular weight of the shell can be appropriately maintained, the mechanical properties and surface properties of the graft copolymer can be more improved.

The water may be distilled water or ion-exchanged water.

In the method for preparing a graft copolymer according to one embodiment of the present invention, a coagulation process may be further carried out when the addition of the alkyl acrylate-based polymer is completed. In addition, after the coagulation process, aging, dehydration, washing, and drying processes may be further carried out to prepare a graft copolymer powder.

2. Graft Copolymer

The graft copolymer according to another embodiment of the present invention includes: an alkyl (meth)acrylate-based monomer unit; an aromatic vinyl-based monomer unit; a vinyl cyan-based monomer unit; and a derivative of a compound represented by Chemical Formula 1, and a core thereof has an average particle diameter of 320 to 520 nm.

<Chemical Formula 1>

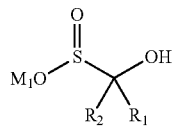

In Chemical Formula 1, $R_1$ and $R_2$, which are the same or different from each other, are each independently hydrogen, a $C_1$-$C_{10}$ alkyl group, or *—(C=O)OM$_2$, provided that $R_1$ and $R_2$ are not both hydrogen, and $M_1$ and $M_2$, which are the same or different from each other, are each independently an alkali metal.

The derivative of the compound represented by Chemical Formula 1 may be a product obtained from the decomposition of the compound represented by Chemical Formula 1 during the preparation of a graft copolymer.

The compound represented by Chemical Formula 1 has been described above.

The average particle diameter of the core is preferably 330 to 500 nm and more preferably 350 to 450 nm. When the above-described range is satisfied, a graft copolymer which exhibits excellent stability during polymerization and is excellent in weather resistance, impact resistance, and surface gloss characteristics can be prepared. When the average particle diameter is below the above-described range, impact resistance may be lowered, and when the average particle diameter exceeds the above-described range, surface gloss characteristics may be degraded.

The graft copolymer may contain volatile organic compounds in a total amount of 640 ppm or less or 600 ppm or less, with the range of 600 ppm or less being preferred. When the above-described range is satisfied, an environmentally-friendly graft copolymer can be prepared, and in addition, since the amount of a gas-generating material is significantly reduced during the processing of the thermoplastic resin composition, a molded article having excellent appearance characteristics can be produced.

The graft copolymer may have a TGA value of 98.6 wt % or more or 99 wt % or more, with the range of 99 wt % or more being preferred.

When the above-described range is satisfied, the thermal stability of the graft copolymer can be significantly improved.

Other descriptions of the graft copolymer are given in the part "1. Method for preparing graft copolymer," and the graft copolymer according to another aspect of the present invention can be prepared by the method for preparing a graft copolymer according to one aspect of the present invention.

3. Thermoplastic Resin Composition

The thermoplastic resin composition according to still another embodiment of the present invention contains: the graft copolymer according to another embodiment of the present invention; and a matrix copolymer including an aromatic vinyl-based monomer unit and a vinyl cyan-based monomer unit.

The matrix copolymer may include the aromatic vinyl-based monomer unit and the vinyl cyan-based monomer unit in a weight ratio of 60:40 to 80:20 or 65:35 to 75:25, with the range of 65:35 to 75:25 being preferred. When the above-described contents are satisfied, a thermoplastic resin composition excellent in all of heat resistance, fluidity, and chemical resistance can be provided.

The thermoplastic resin composition may include the graft copolymer and the matrix copolymer in a weight ratio of 35:65 to 55:45 or 40:60 to 50:50, with the range of 40:60 to 50:50 being preferred. When the above-described range is satisfied, a thermoplastic resin composition excellent in colorability, weather resistance, heat resistance, fluidity, chemical resistance, thermal stability, and appearance characteristics can be prepared.

The thermoplastic resin composition may further include an additive such as a dye, a pigment, a lubricant, an antioxidant, a UV stabilizer, a thermal stabilizer, a reinforcing agent, a filler, a flame retardant, a foaming agent, a plasticizer, a matting agent, or the like depending on the area of application.

4. Thermoplastic Resin Molded Article

A thermoplastic resin molded article formed of the thermoplastic resin composition according to still another embodiment of the present invention may have an impact strength of 21.3 kg·cm/cm or more and a thermal retention stability of 4.5 or less, and preferably an impact strength of 21.5 kg·cm/cm or more and a thermal retention stability of 3.9 or less.

When the above-described conditions are satisfied, a thermoplastic resin molded article having excellent impact resistance and excellent thermal stability can be produced.

Hereinafter, exemplary embodiments of the present invention will be described in detail so that those of ordinary skill in the art can easily carry out the present invention. However, it should be understood that the present invention can be implemented in various forms and that the exemplary embodiments are not intended to limit the present invention thereto.

EXAMPLE 1

<Preparation of Seed>

5 parts by weight of styrene, 2 parts by weight of acrylonitrile, 0.2 part by weight of sodium dodecyl sulfate as an emulsifier, 0.04 part by weight of ethylene glycol dimethacrylate as a crosslinking agent, 0.02 part by weight of allyl methacrylate as a grafting agent, 0.1 part by weight of KOH as an electrolyte, and 50 parts by weight of distilled water were batch-added to a nitrogen-substituted reactor, the temperature was raised to 70° C., and then a reaction was initiated by batch-adding 0.04 part by weight of potassium persulfate as an initiator. The polymerization was carried out for 2 hours and then terminated, and thereby a seed was obtained.

<Preparation of Core>

Polymerization was carried out for 4 hours at 70° C. while continuously adding a homogeneous mixture containing 50 parts by weight of butyl acrylate, 0.5 part by weight of sodium dodecyl sulfate as an emulsifier, 0.2 part by weight of ethylene glycol dimethacrylate as a crosslinking agent, 0.2 part by weight of allyl methacrylate as a grafting agent, 15 parts by weight of distilled water, and 0.05 part by weight of potassium persulfate as an initiator to the seed-containing reactor at a constant rate. After the continuous addition was completed, polymerization was further performed for another 1 hour and then terminated, and thereby a core was obtained.

<Preparation of Shell>

A polymerization reaction was carried out for 3.5 hours at 75° C. while continuously adding each one of a homogeneous mixture containing 23 parts by weight of distilled water, 31.5 parts by weight of styrene, 11.5 parts by weight of acrylonitrile, 1.5 parts by weight of potassium rosinate as an emulsifier, and 0.1 part by weight of cumene hydroperoxide as an initiator and an aqueous solution (concentration: 5 wt %) containing 0.25 part by weight of Bruggolite® FF6M (manufactured by Bruggemann Chemical) as an activator to the core-containing reactor. After the continuous addition was completed, polymerization was further performed at 75° C. for another 1 hour and then terminated by cooling to a temperature of 60° C., and thereby a graft copolymer latex was prepared.

<Preparation of Graft Copolymer Powder>

The graft copolymer latex was coagulated at 70° C. and atmospheric pressure by applying 0.8 part by weight of an aqueous calcium chloride solution (concentration: 23 wt %) thereto, aged at 93° C., dehydrated, washed, and then dried with 90° C. hot air for 30 minutes, and thereby a graft copolymer powder was prepared.

<Preparation of Thermoplastic Resin Composition>

A thermoplastic resin composition containing 44 parts by weight of the graft copolymer powder and 56 parts by weight of a hard matrix copolymer (90HR manufactured by LG Chem Ltd.) was prepared.

EXAMPLE 2

A graft copolymer powder and a thermoplastic resin composition were prepared in the same manner as in Example 1 except that, in the preparation of a shell, an aqueous solution (concentration: 5 wt %) containing 0.25 part by weight of Bruggolite® FF6M (manufactured by Bruggemann Chemical) was dividedly added, in equal amounts, before the initiation of polymerization, at 1 hour after the initiation of polymerization, at 2 hours after the initiation of polymerization, and at 3 hours after the initiation of polymerization.

EXAMPLE 3

A graft copolymer powder and a thermoplastic resin composition were prepared in the same manner as in Example 1 except that t-butyl hydroperoxide was used instead of cumene hydroperoxide as an initiator in the preparation of a shell.

EXAMPLE 4

A graft copolymer powder and a thermoplastic resin composition were prepared in the same manner as in Example 1 except that 0.275 part by weight of sodium dodecyl sulfate was used as an emulsifier in the preparation of a seed.

EXAMPLE 5

A graft copolymer powder and a thermoplastic resin composition were prepared in the same manner as in Example 1 except that 0.25 part by weight of sodium dodecyl sulfate was used as an emulsifier in the preparation of a seed.

EXAMPLE 6

A graft copolymer powder and a thermoplastic resin composition were prepared in the same manner as in Example 1 except that 0.18 part by weight of sodium dodecyl sulfate was used as an emulsifier in the preparation of a seed.

EXAMPLE 7

A graft copolymer powder and a thermoplastic resin composition were prepared in the same manner as in Example 1 except that 0.15 part by weight of sodium dodecyl sulfate was used as an emulsifier in the preparation of a seed.

COMPARATIVE EXAMPLE 1

A graft copolymer powder and a thermoplastic resin composition were prepared in the same manner as in Example 1 except that an aqueous solution (concentration: 5 wt %) containing 0.09 part by weight of sodium pyrophosphate, 0.12 part by weight of dextrose, and 0.002 part by weight of ferrous sulfate was used as an activator in the preparation of a shell.

COMPARATIVE EXAMPLE 2

A graft copolymer powder and a thermoplastic resin composition were prepared in the same manner as in Example 1 except that an aqueous solution (concentration: 5 wt %) containing 0.02 part by weight of ethylenediaminetetraacetic acid (EDTA), 0.08 part by weight of sodium formaldehyde sulfoxylate (SFS), and 0.002 part by weight of ferrous sulfate was used as an activator in the preparation of a shell.

COMPARATIVE EXAMPLE 3

A graft copolymer powder and a thermoplastic resin composition were prepared in the same manner as in Example 1 except that 0.3 part by weight of sodium dodecyl sulfate was used as an emulsifier in the preparation of a seed.

COMPARATIVE EXAMPLE 4

A graft copolymer powder and a thermoplastic resin composition were prepared in the same manner as in Example 1 except that 0.125 part by weight of sodium dodecyl sulfate was used as an emulsifier in the preparation of a seed.

EXPERIMENTAL EXAMPLE 1

The properties of the graft copolymers of Examples and Comparative Examples were determined by the methods described below, and the results are shown in Table 1 and Table 2.

① Average particle diameter (in nm): measured by a dynamic light scattering method using a particle size analyzer (Nicomp 380).

② Polymerization conversion rate: {(Weight of solid content of actually obtained graft copolymer latex)/(Weight of solid content of prescriptively added monomers)}×100

③ Total amount of volatile organic compounds ("TVOC"): determined, at a ppm level, by subjecting 1 g of a graft copolymer powder to HS-GC/FID and analyzing the components of the volatile organic compounds released under the conditions of 230° C., 60 minutes, and 20 ml.

④ Thermogravimetric analysis ("TGA"): carried out by increasing the temperature of 0.1 g of a graft copolymer powder from 30° C. to 250° C. at a rate of 20° C./min under a nitrogen atmosphere and then maintaining the temperature at 250° C. for 1 hour. Weight loss was measured and is expressed in terms of a residual amount (in wt %). In this case, higher values of the residual amount indicate better thermal stability.

TABLE 1

| Classification | Average particle diameter | | | Polymerization conversion rate (%) | TVOC (ppm) | TGA (wt %) |
|---|---|---|---|---|---|---|
| | Seed (nm) | Core (nm) | Graft copolymer (nm) | | | |
| Example 1 | 210 | 420 | 525 | 99 | 550 | 99.6 |
| Example 2 | 210 | 420 | 520 | 98.5 | 560 | 99.5 |
| Example 3 | 210 | 420 | 522 | 98.7 | 540 | 99.4 |
| Example 4 | 150 | 330 | 400 | 99.2 | 575 | 99.3 |
| Example 5 | 170 | 350 | 425 | 99.1 | 570 | 99.2 |
| Example 6 | 225 | 450 | 550 | 98.0 | 595 | 99.2 |
| Example 7 | 240 | 500 | 600 | 97.5 | 600 | 99.3 |
| Comparative Example 1 | 210 | 420 | 520 | 98 | 680 | 98 |
| Comparative Example 2 | 210 | 420 | 515 | 97.5 | 800 | 97 |
| Comparative Example 3 | 140 | 300 | 360 | 99.3 | 650 | 98 |
| Comparative Example 4 | 270 | 550 | 650 | 95.0 | 900 | 96.5 |

Referring to Table 1, it can be seen that in the graft copolymers of Examples 1 to 7, the total amount of volatile organic compounds was significantly lower and the residual amount of resin as determined by TGA was significantly higher than in the graft copolymers of Comparative Examples 1 to 4.

Based on these results, it can be inferred that in the preparation of the graft copolymers of Examples 1 to 7, the addition of a specific activator and a core having a specific average particle diameter produced a synergistic effect in preparing a graft copolymer which is environmentally friendly and also has excellent impact resistance and excellent thermal stability.

EXPERIMENTAL EXAMPLE 2

Each of the thermoplastic resin compositions of Examples and Comparative Examples was homogeneously mixed with 1.5 parts by weight of a lubricant (EBS manufactured by LG Household & Health Care Ltd.), 1.0 part by weight of an antioxidant (IR1076 manufactured by BASF), and 1.0 part by weight of a UV stabilizer (Tinuvin 770 manufactured by BASF), and then the mixture was prepared in the form of a pellet using a 36-phi extrusion kneading machine at 220° C. The fluidity of the pellet was measured by the method described below, and the results are shown in Table 2 and Table 3.

⑤ Melt flow index (MI; g/10 min): measured in accordance with ASTM D-1238 at 220° C. and 10 kg.

EXPERIMENTAL EXAMPLE 3

The pellets prepared in Experimental Example 2 were injection-molded to prepare specimens. The properties of the specimens were determined by the methods described below, and the results are shown in Table 2 and Table 3.

⑥ Thermal retention stability: determined by measuring the L, a, and b values of a retention specimen and a non-retention specimen with a spectrophotometer and then calculating a degree of discoloration ($\Delta E$) using the equation provided below, wherein the retention specimen was prepared by introducing a thermoplastic resin composition in the form of a pellet into an injection-molding machine and injection-molding the composition at 260° C. after maintaining it in a 260° C. injection-molding machine for 5 minutes, and the non-retention specimen was prepared by introducing a thermoplastic resin composition in the form of a pellet into an injection-molding machine and injection-molding the composition at 260° C. without retention:

$$\Delta E = \sqrt{(L'-L)^2 + (a'-a)^2 + (b'-b)^2}$$

⑦ IZOD impact strength (kg·cm/cm): measured in accordance with ASTM 256, by preparing a ¼ inch-thick specimen.

⑧ L, a, and b values: determined in the CIE LAB color coordinate system.

⑨ Surface gloss: determined in accordance with ASTM D528 at an angle of −45°.

⑩ Whiteness: measured using a colorimeter (manufactured by Suga Test Instruments Co., Ltd.)

⑪ Weather resistance (SE): determined in accordance with ASTM G115-1, by maintaining each specimen for 2,000 hours using an accelerated weather resistance testing instrument (Ci4000 Weather-Ometer manufactured by ATLAS, xenon-arc lamp, quartz (inner)/S.Boro (outer) filter, irradiance: 0.55 W/m² at 340 nm), subsequently measuring a degree of discoloration using a color difference meter, and then substituting measurements into the equation provided below to calculate $\Delta E$.

Here, $\Delta E$ is an arithmetic average value calculated using the CIE L, a, and b values obtained before and after the weather resistance test, and values closer to 0 indicate better weather resistance.

$$\Delta E = \sqrt{(L'-L)^2 + (a'-a)^2 + (b'-b)^2}$$

⑫ Number of protrusions: determined by processing each thermoplastic resin composition into a 0.01 mm-thick film by performing extrusion at 220° C. and then counting the number of unmelted protrusions. Smaller values for the number of protrusions indicate a better appearance of the processed thin film.

TABLE 2

| Classification | Example 1 | Example 2 | Example 3 | Example 4 | Example 5 | Example 6 | Example 7 |
|---|---|---|---|---|---|---|---|
| Fluidity (g/10 min) | 10.5 | 10 | 10 | 9.5 | 9.8 | 11.0 | 11.2 |
| Thermal retention stability (ΔE) | 3.3 | 3.5 | 3.7 | 3.9 | 3.7 | 3.9 | 3.7 |
| Impact strength (kg · cm/cm) | 26.5 | 27.0 | 26.0 | 21.5 | 23.5 | 28.0 | 29.0 |
| L | 88.5 | 88.2 | 87.8 | 88.8 | 88.5 | 87.6 | 87.4 |
| a | −1.45 | −1.46 | −1.36 | −1.30 | −1.32 | −1.48 | −1.50 |
| b | 7.5 | 7.6 | 7.9 | 8.3 | 8.1 | 7.2 | 7.0 |
| Surface gloss | 103.5 | 103.0 | 104.0 | 105 | 104.5 | 103.0 | 102.7 |
| Whiteness | 65.5 | 66.0 | 65.0 | 64.5 | 64.7 | 66.2 | 66.5 |
| Number of protrusions (50 to 500 μm) | 420 | 430 | 440 | 420 | 410 | 460 | 480 |
| Weather resistance (ΔE) | 1.6 | 1.8 | 1.9 | 1.5 | 1.5 | 1.9 | 2.0 |

TABLE 3

| Classification | Comparative Example 1 | Comparative Example 2 | Comparative Example 3 | Comparative Example 4 |
|---|---|---|---|---|
| Fluidity (g/10 min) | 10.0 | 9.0 | 7.0 | 14.0 |
| Thermal retention stability (ΔE) | 5.2 | 5.5 | 5.0 | 6.0 |
| Impact strength (kg · cm/cm) | 25.0 | 21.0 | 17.0 | 28.0 |
| L | 86.5 | 86.0 | 89.0 | 85.0 |
| a | −1.48 | −1.50 | −1.1 | −1.7 |
| b | 8.8 | 9.5 | 9.0 | 95 |
| Surface gloss | 99.0 | 98.0 | 103 | 80 |
| Whiteness | 62.0 | 60.5 | 62.0 | 60.0 |
| Number of protrusions (50 to 500 μm) | 900 | 1,000 | 700 | 1,200 |
| Weather resistance (ΔE) | 2.8 | 2.5 | 1.8 | 3.5 |

Referring to Table 2 and Table 3, it can be confirmed that Examples 1 to 7 were generally superior to Comparative Examples 1 to 4 in terms of thermal retention stability, impact strength, clarity, color characteristics, gloss characteristics, whiteness, appearance characteristics, and weather resistance.

It can be particularly seen that Examples 1 to 3 were superior to Comparative Examples 1 and 2 in terms of all properties, even though they were different from Comparative Examples 1 and 2 only in the types of activators used.

In addition, it can be seen that Comparative Example 3, in which a graft copolymer having a smaller average core particle diameter than the graft copolymers of the present invention was used, exhibited not only a significant degradation in impact strength but also a degradation in thermal retention stability, color characteristics, whiteness, and appearance characteristics compared to Examples.

In addition, it can be seen that Comparative Example 4, in which a graft copolymer having a larger average core particle diameter than the graft copolymers of the present invention was used, exhibited about the same level of impact strength but a significant degradation in retention thermal stability, clarity, color characteristics, whiteness, appearance characteristics, and weather resistance compared to Examples.

The invention claimed is:

1. A method for preparing a graft copolymer, the method comprising:
   1) preparing a seed by adding a crosslinking agent, a grafting agent, one or more selected from the group consisting of an alkyl (meth)acrylate-based monomer, an aromatic vinyl-based monomer, and a vinyl cyan-based monomer and carrying out polymerization;
   2) preparing a core in the presence of the seed by adding an alkyl (meth)acrylate-based monomer, a crosslinking agent and a grafting agent and carrying out polymerization; and
   3) preparing a shell in the presence of the core by adding an aromatic vinyl-based monomer and a vinyl cyan-based monomer and carrying out polymerization,
   wherein an activator including a compound represented by Chemical Formula 1 is added in 3), and wherein the core has an average particle diameter of 320 nm to 520 nm;

<Chemical Formula 1>

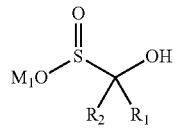

In Chemical Formula 1, $R_1$ and $R_2$, which are the same or different from each other, are each independently hydrogen, a $C_1$-$C_{10}$ alkyl group, or *-(C=O)OM$_2$, provided that $R_1$ and $R_2$ are not both hydrogen, and $M_1$ and $M_2$, which are the same or different from each other, are each independently an alkali metal.

2. The method of claim 1, wherein the core has an average particle diameter of 330 nm to 500 nm.

3. The method of claim 1, wherein an alkyl (meth) acrylate-based monomer is not added in 3).

4. The method of claim 1, wherein, in Chemical Formula 1, $R_1$ and $R_2$, which are the same or different from each other, are each independently hydrogen or -(C=O)OM$_2$.

5. The method of claim 1, wherein, in Chemical Formula 1, $M_1$ and $M_2$, which are the same or different from each other, are each independently Na or K.

6. The method of claim 1, wherein the activator includes a compound represented by Chemical Formula 2:

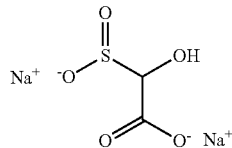

<Chemical Formula 2>

7. The method of claim 1, wherein the activator is added in a continuous manner.

8. The method of claim 1, wherein the activator is added in a state of being mixed with a solvent.

9. The method of claim 1, wherein the activator is added in an amount of 0.01 part by weight to 1 part by weight based on 100 parts by weight of the sum of the alkyl (meth)acrylate-based monomer, the aromatic vinyl-based monomer, and the vinyl cyan-based monomer.

10. The method of claim 1, wherein the activator is added in an amount of 0.1 part by weight to 0.8 part by weight based on 100 parts by weight of the sum of the alkyl (meth)acrylate-based monomer, the aromatic vinyl-based monomer, and the vinyl cyan-based monomer.

11. A graft copolymer, comprising:

a seed comprising one or more selected from the group consisting of an alkyl (meth)acrylate-based monomer, an aromatic vinyl-based monomer, and a vinyl cyan-based monomer;

a core comprising an alkyl (meth)acrylate-based monomer unit; and a shell comprising an aromatic vinyl-based monomer unit, a vinyl cyan-based monomer unit, and a derivative of a compound represented by Chemical Formula 1, wherein the core has an average particle diameter of 320 nm to 520 nm;

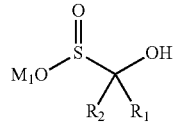

<Chemical Formula 1>

In Chemical Formula 1, $R_1$ and $R_2$, which are the same or different from each other, are each independently hydrogen, a $C_1$-$C_{10}$ alkyl group, or *-(C=O)OM$_2$, provided that $R_1$ and $R_2$ are not both hydrogen, and $M_1$ and $M_2$, which are the same or different from each other, are each independently an alkali metal.

12. The graft copolymer of claim 11, wherein the core has an average particle diameter of 330 nm to 500 nm.

13. The graft copolymer of claim 11, wherein a total amount of volatile organic compounds is 640 ppm or less.

14. The graft copolymer of claim 11, which has a thermogravimetric analysis (TGA) value of 98.6 wt % or more.

15. A thermoplastic resin molded article formed of a thermoplastic resin composition and has an impact strength of 21.3 kgcm/cm or more and a thermal retention stability of 4.5 or less, wherein the thermoplastic resin composition includes:

the graft copolymer of claim 11; and a matrix copolymer including an aromatic vinyl-based monomer unit and a vinyl cyan-based monomer unit.

* * * * *